June 7, 1955 E. R. BOLLES 2,710,097
APPARATUS FOR RECOVERING SUGAR CANE FROM LEAF TRASH
Filed May 18, 1953 4 Sheets-Sheet 1

ELMER RICHARD BOLLES
INVENTOR.

BY
ATTORNEYS

June 7, 1955  E. R. BOLLES  2,710,097
APPARATUS FOR RECOVERING SUGAR CANE FROM LEAF TRASH
Filed May 18, 1953  4 Sheets-Sheet 2

ELMER RICHARD BOLLES
INVENTOR.

BY
ATTORNEYS

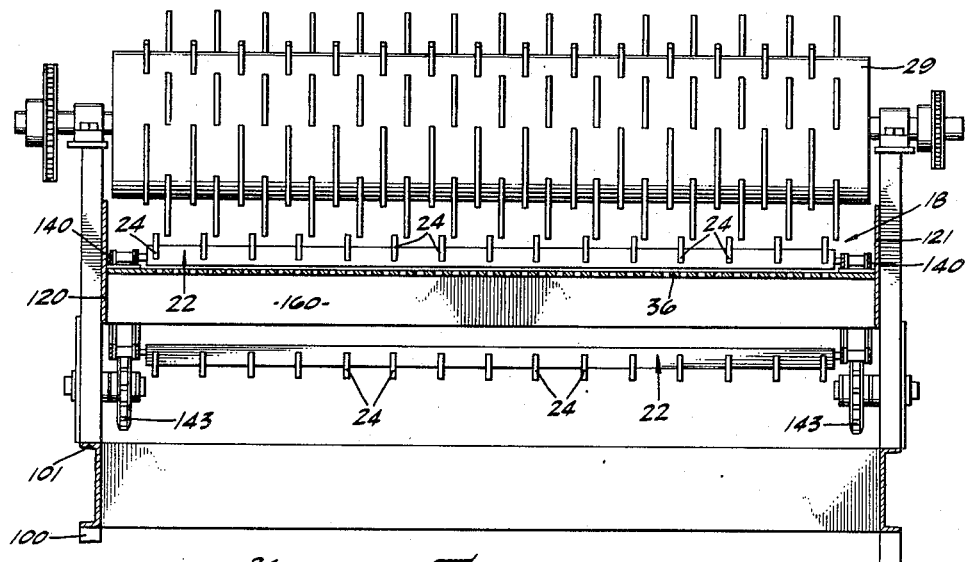
FIG. 4.
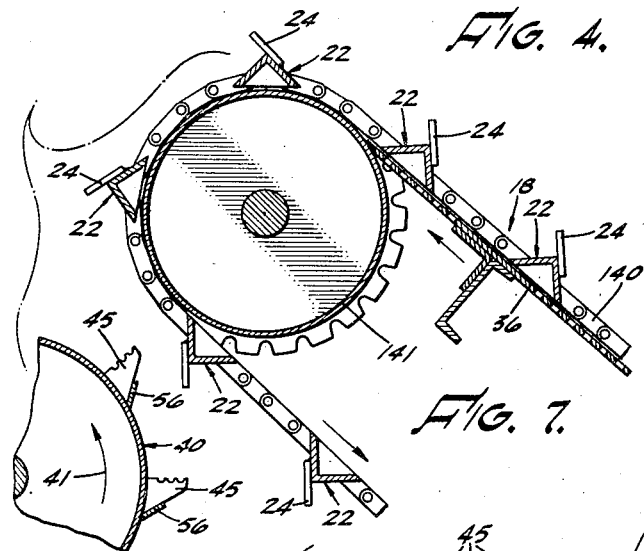
FIG. 7.
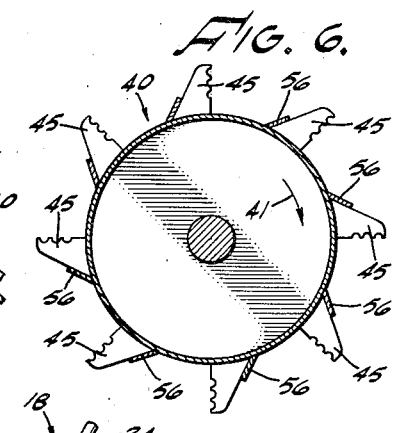
FIG. 6.
FIG. 8.
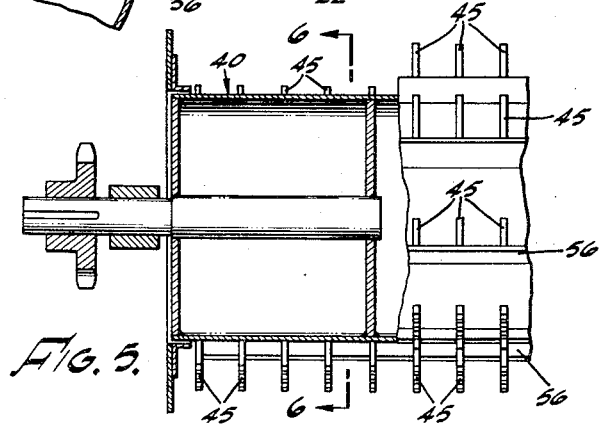
FIG. 5.
ELMER RICHARD BOLLES
INVENTOR.
BY
ATTORNEYS June 7, 1955 E. R. BOLLES 2,710,097
APPARATUS FOR RECOVERING SUGAR CANE FROM LEAF TRASH
Filed May 18, 1953 4 Sheets-Sheet 4

ELMER RICHARD BOLLES
INVENTOR.

BY
ATTORNEYS

United States Patent Office 2,710,097
Patented June 7, 1955

2,710,097

APPARATUS FOR RECOVERING SUGAR CANE FROM LEAF TRASH

Elmer Richard Bolles, Oahu, Territory of Hawaii, assignor to Hawaiian Sugar Planters Association, Honolulu, Oahu, Territory of Hawaii, an unincorporated association Application May 18, 1953, Serial No. 355,794

4 Claims. (Cl. 209—12)

The present invention relates broadly to improved means and techniques whereby stalk material, such as sugar cane, is separated from or salvaged from leaf trash.

In the processing of sugar cane, it is desirable to separate the sugar cane from the associated leaf trash. For this purpose, the sugar cane, as harvested, is first cleaned in a machine which serves to extract most of the leaf trash from the sugar cane. However, since the machine is not perfect in its operation, it removes some of the sugar cane with the leaf trash. Normally, this sugar cane which is removed with the leaf trash is lost unless the sugar cane is salvaged, i. e., the sugar cane intermingled with the leaf trash is subjected to a further separation process.

The present arrangement involves a tank of water or reservoir into which the intermingled sugar cane and trash is fed. The intermingled trash and sugar cane is raised out of such tank by a special conveyor which moves past a special combing roller serving generally to orient the cane stalks. After passing such combing roller, the trash and oriented cane stalks are allowed to fall by gravity onto a notched toothed drum which serves to retain the trash but to reject the cane stalks and to direct such cane stalks into a separate compartment. On the other hand, the trash retained by the drum is subsequently blown therefrom into a different compartment by an air jet.

It is, therefore, a general object of the present invention to provide improved means and techniques for separating leafy material from stalk material.

A specific object of the present invention is to provide improved means and techniques whereby the results described above may be accomplished in the manner indicated.

Another specific object of the present invention is to provide improved means of this character which involves a notched toothed drum for impaling the leaf trash so as to hold it in opposition to centrifugal forces acting on such trash, until the trash has reached a position where it may be stripped from the notched teeth by a jet of high velocity air.

Another specific object of the present invention is to provide an arrangement of this character in which the conveyor serving to raise the combined trash and sugar cane moves through the tank of water in a streamlined fashion so as to reduce turbulence to a minimum and to prevent the water from washing the impaled trash from the flight fingers comprising such conveyor.

Another specific object of the present invention is to provide an arrangement of this character in which means in the form of a paddle wheel serves to facilitate the flow of trash and cane from the water tank or reservoir to the conveyor elevator.

Another specific object of the present invention is to provide an arrangement of this character which involves a water tank or reservoir for the purpose of receiving and storing up, momentarily, peak loads of trash and cane so that a more uniform flow of such combined material may be maintained to the feeder conveyor or elevator.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2:
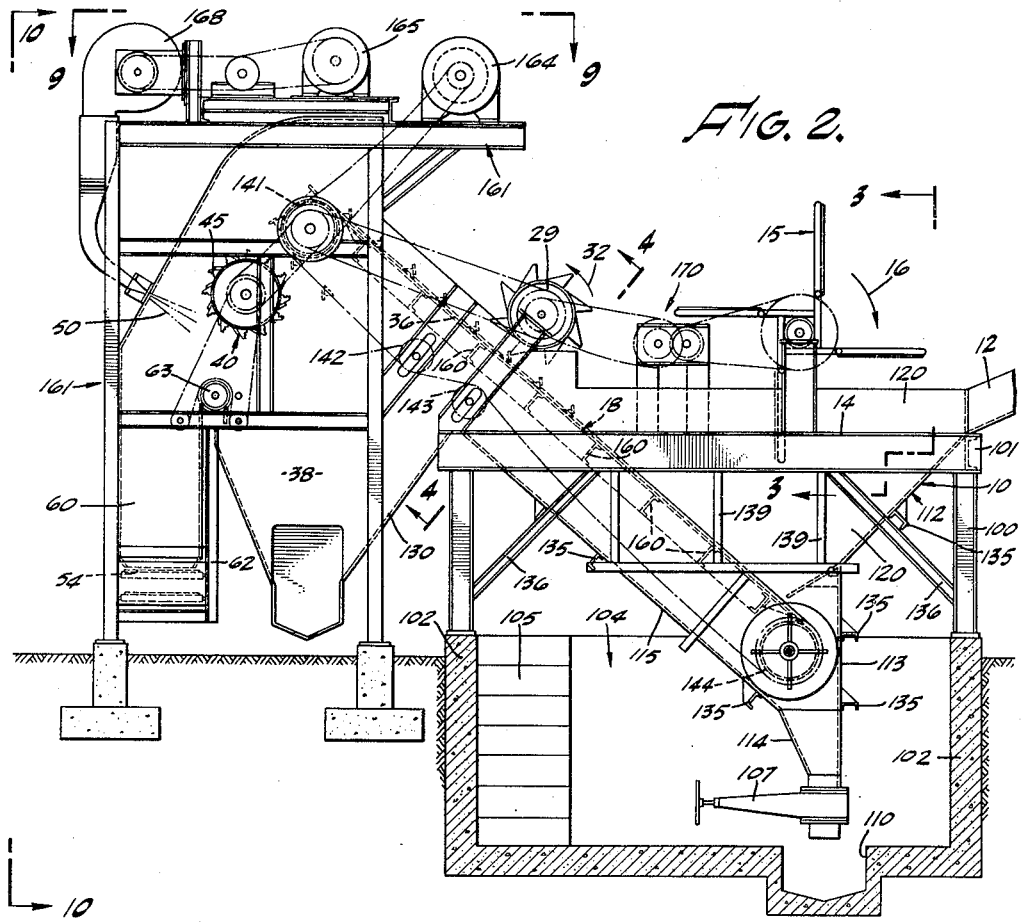
Figure 2 shows in detailed form apparatus of the character contemplated in Figure 1 and operating generally with the same mode of operation and producing substantially the same results.
Figure 3:
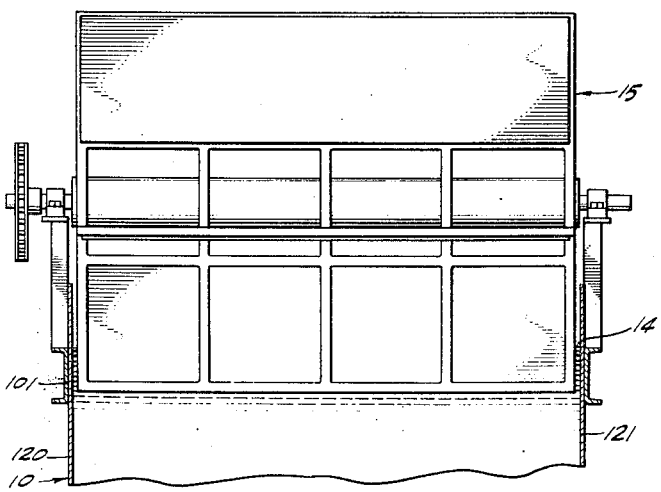

Figures 3 and 4 are views taken generally on the lines 3—3 and 4—4 in Figure 2.

Figure 1:
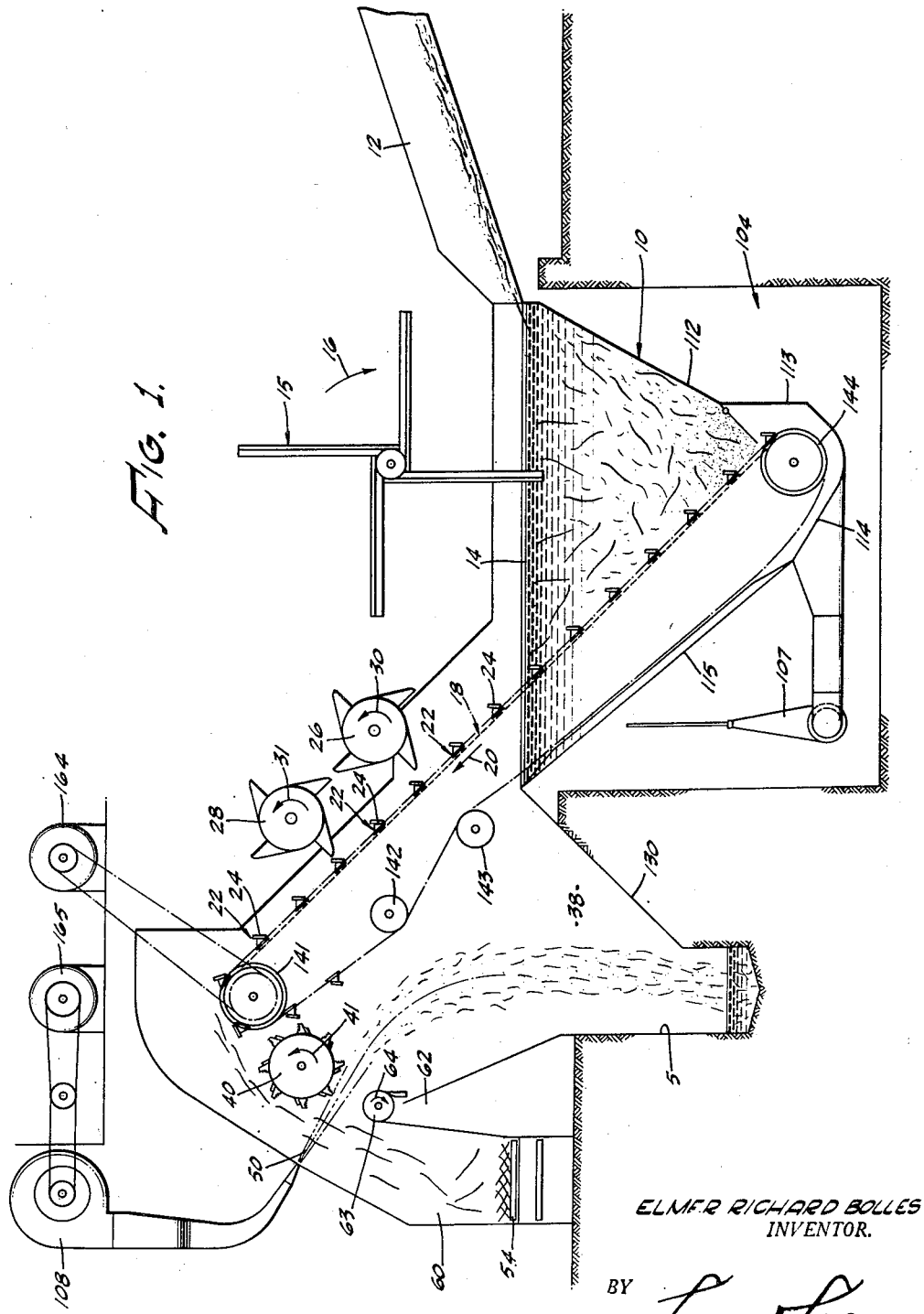
Figure 1 shows apparatus embodying features of the present invention, such apparatus being described in greater detail in connection with the other figures herein.

Figure 5 is a view, partly in section and partly in elevation, of the notched toothed drum incorporated in the arrangements illustrated in Figures 1 and 2.

Figure 6 is a sectional view taken substantially on the lines 6—6 of Figure 5.

Figure 7 is an enlarged sectional view showing details of the flight conveyor and associated notched toothed drum.

Figure 8 is a perspective view showing certain constructional features of the flight conveyor.

Figure 10:
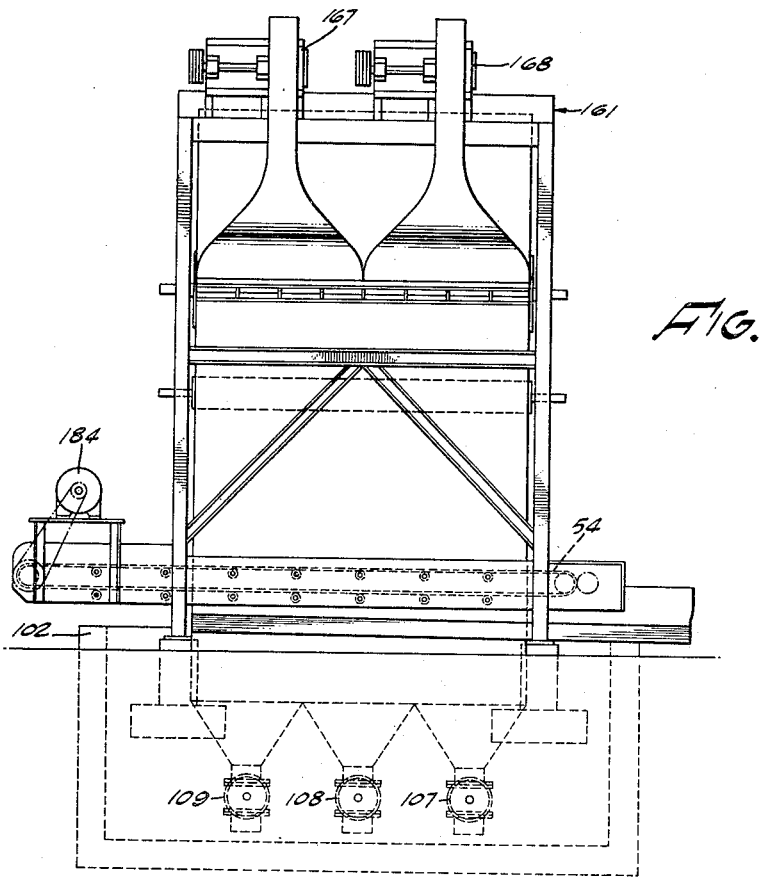
Figure 9:
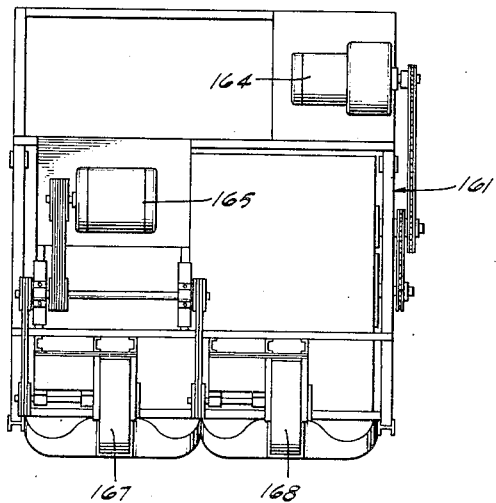

Figures 9 and 10 are elevation views taken generally in the direction indicated by the lines 9—9 and 10—10 in Figure 2.

Referring to Figure 1 wherein the apparatus is shown in simplified form, the intermingled leaf trash and sugar cane is fed into a tank of water or reservoir 10, from an inclined flume 12, down which also water continuously runs to maintain the water level in the tank 10 at a level indicated by the line 14. The leaf trash and sugar cane floats while any extraneous dirt or debris sinks to the bottom of the tank 10.

The paddle wheel 15, which continuously rotates in the clockwise direction indicated by the arrow 16, serves to feed the floating leaf trash and sugar cane in the direction of the flight conveyor 18 which moves generally upwardly continuously in the direction indicated by the arrow 20.

One purpose of the tank 10 is to receive and store up, momentarily, the heavy peak loads of trash which exceed the optimum design capacity of the salvager and, further, to facilitate the spreading of the trash across the full width of the flight or feeder conveyor or elevator 18.

The feeder elevator 18, as shown in Figures 1, 7 and 8, is of special construction and comprises a plurality of carrying flights 22 having a generally triangular cross section. Each of these flights 22 has a plurality of rods 24 welded thereto in spaced relationship so as to provide generally a comb element, which is illustrated, perhaps more fully in Figure 4. These rods 24 serve also as trash impaling elements. Also, these flights, having the general reference numeral 22, serve to convey the cane upwardly whereby such cane is subjected to a pair of combing rollers 26 and 28 (Figure 1) which serve generally to kick back and thin out lumps of trash and cane moving upwardly on the flight conveyor 18. While Figure 1 shows two of such combing rolls 26 and 28, these two rolls may be replaced by a single roll 29 as shown in Figure 2. These combing rolls 26 and 28 in Figure 1, as well as the corresponding roll 29 in Figure 2, continuously rotate in the counterclockwise direction, as indicated by the corresponding arrows 30, 31 and 32.

In Figure 1 the first combing roll 26 is set about 1½ inches above elevator or flight conveyor 18, while the other combing roll 28 is set closer to the flight conveyor and its general purpose is to comb the trash and cane parallel to each other, in other words, to accomplish a primary purpose of partially separating cane stalks from the leaf trash. This function accomplished by the roll 28 in Figure 1 is accomplished likewise by the roll 29 in Figure 2.

The flights 22 of the flight conveyor 18 are preferably triangular in cross section as shown in Figure 8 so as to cause a streamlined flow of water over such flights when and as they move through the tank of water to thereby reduce to a minimum any water turbulence ahead of the rapidly moving flights 22 which otherwise would tend to wash the leaf trash away from the rods or fingers 24. Further, such flights 22, as shown in Figure 7, slide upwardly on the perforated stationary deck member 36, such member 36 being perforated to allow the flume water to pass through it and to either return to the tank 10 or to drop into the overflow tank 38.

After the trash and cane reach the uppermost point of the flight conveyor 18, the trash and cane is allowed to fall onto the notched toothed drum 40 which continuously rotates in the counterclockwise direction as illustrated by the arrow 41. Details of this drum 40 are illustrated in Figures 5, 6 and 7.

The drum 40 has a plurality of rows of fingers 45 welded thereto. Each of such fingers 45 is of generally triangular shape and formed from plate stock. The leading edge of each of the fingers 45 is notched or serrated as illustrated in Figures 6 and 7 for impaling the leaf trash and pulling it down to the under side of the drum in opposition to the centrifugal force developed by the mass of such leaf trash. Preferably, the notches are semi-circular notches as illustrated in Figures 6 and 7. The normal position of the trash, as the drum rotates, is one in which the trash is hooked onto the drum fingers by such notches. In such position, the leaf trash is moved to the under side of the drum where it comes under the influence of a flat jet of high velocity air 50 which serves to strip the leaf trash free of the notched fingers to thereby allow such trash to fall free into the disposal flume or trash conveyor 52.

On the other hand, the cane is not influenced appreciably by such jet of high velocity air 50 and such cane is directed onto the conveyor belt 54 by the drum 40 which, besides the notched teeth, has a plurality of transversely extending bars 56 welded thereto as shown in Figures 5, 6 and 7. These bars 56 of sheet stock material are preferably welded to the back inclined edge of the fingers 45.

These bars 56 extend the full length of the drum 40 and serve to reject the stalks and give impetus to the cane stalks which usually discharge lengthwise from the feeder or flight conveyor 18 onto the drum 40. These bars 56 propel the cane away from the drum, through the air blast 50, to a position where the cane falls onto the return conveyor belt 54 which serves to transport the cane to a storage point (not shown).

The trash compartment 52 is separated from the cane compartment 60 by the wall 62 which has mounted on the upper end thereof, a roller 63 continuously rotating in the clockwise direction, as indicated by the arrow 64, for preventing the trash from accumulating on the upper edge of such wall. For this reason the roll 63 is termed a hang-up roll since its purpose is to prevent the building up of trash on the wall 62.

Thus, in operation of the arrangement, the intermingled trash and cane enters the tank 10 from the flume 12. The trash and cane is directed to the flight conveyor 18 by the paddle wheel 15. While such trash and cane is being moved upwardly by the conveyor 18, it is acted upon by the combing rolls 26 and 28 so as to effectively break up any accumulated mass, and in general to orient the stalks of cane. After the trash and cane reach the upper end of the flight conveyor 18, the cane and trash is allowed to drop onto the drum 40 which effectively serves to discriminate between the leaf trash and the stalks, the leaf trash being directed, with the aid of the air stream 50, into the trash chamber 52 whereas, the cane stalks are directed into the cane compartment 60.

For a more detailed description of the arrangement, reference is now made to the structure illustrated in Figures 2–10.

With reference to Figure 2, the tank 10 is supported on a metal framework 100. The tank 10 is of metal construction and the level of the water therein, as indicated by the line 14, corresponds to the upper edge of the channel member 101 which is a part of the frame 100.

The framework 100 is supported on concrete walls 102 which define a pit 104 having a stairway 105 so as to gain access to the three valves 107, 108 and 109, such valves being used to allow drainage of the tank 10 when it is desired to clean the same. The water and debris which is drained flows into the concrete trough or channel 110.

The tank 10 is made of substantially sheet stock material and comprises the walls 112, 113, 114, 115, as well as a pair of parallel extending end walls 120, 121 shown in Figures 3 and 4. The wall 115 extends upwardly, as shown in Figure 2, to the upper edge of the channel member 101 which corresponds to the water level 14. Any excess water is allowed to flow into the overflow chamber 38, such chamber 38 being defined in part by the downwardly inclined wall 130.

The aforementioned end walls 120, 121, as shown in Figures 3 and 4, extend above the water level and serve to guide the movement of the trash and cane as described above.

The tank 10, as described above in connection with Figure 2, is supported on the framework 100 by a plurality of interwelded channel members 135, as well as braces 136 and hangers 139.

As shown in Figures 7 and 8, the flight conveyor 18 comprises a plurality of flight elements 22 having opposite ends thereof connected to a link of a chain 140, there being two such chains 140 provided. The sprocket chains 140 pass over a driving roller 141 and a plurality of guide and idler rollers 142, 143 and 144, such rollers having their shafts journaled for rotation on stationary supporting members by means which are considered conventional and thus need not be described in detail. It is noted that the roller 144 is within the tank 10 and has its shaft journaled on opposite side walls of the tank.

The apertured deck plate 36 for the flight conveyor 18, as shown in Figures 7 and 2, is supported by a plurality of stationary channel members 160 to which such deck plate is welded. The upper driving roller 141 is journaled for rotation on the supporting framework 161 which, as shown in Figure 9, supports the motors 164 and 165 as well as a pair of air blowers or compressors 167 and 168. The motor 165 drives the two blowers 167 and 168 to produce the aforementioned air stream 50. The motor 164 serves to drive the flight conveyor 18, the trash discriminating drum 40, the so-called hang-up roll 64 as well as the paddle wheel 15 and the combing roll 29, all through suitable gearing, sprockets and chains. Satisfactory results may be obtained at the following speeds, namely: the speed of the flight conveyor 18 is 200 feet per minute, the tip speed of the combing roll 29 is 300 feet per minute, the tip speed of the discriminating roll 40 is 265 feet per minute, the tip speed of the paddle wheel 15 is 200 feet per minute with a speed of 10 revolutions per minute; the velocity of the air jet is 14,000 feet per minute.

Further, the conveyor belt 54 (Figures 1 and 2) upon which the separated cane is allowed to fall is driven at a speed of 100 feet per minute by the driving motor 184 (Figure 10).

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, a liquid reservoir, a flume in communication with said reservoir for delivering intermingled leafy and stalk material to said reservoir, a flight conveyor having its lower end immersed in said reservoir and its upper end elevated above said reservoir, a paddle wheel between said flight conveyor and said flume for directing said intermingled material to said flight conveyor, a combing roller cooperating with said flight conveyor for conditioning the material carried by said conveyor, a discriminating drum receiving said material from said flight conveyor, said discriminating drum incorporating means whereby said leafy material clings to the same and said stalk material is rejected therefrom, and means producing an air stream cooperating with said discriminating drum to remove the leafy material therefrom.

2. In an arrangement of the character described, a first compartment for receiving leafy material, a second compartment adjacent to said first compartment for receiving stalk material, a single discriminating roller rotatably mounted above said compartments, means delivering a mixture of leafy and stalk material to said discriminating roller, said roller incorporating means for maintaining the leafy material thereon in opposition to centrifugal forces developed by said leafy material, air jet means cooperating with said roller for removing said leafy material therefrom and for directing the same into said first compartment, and said roller incorporating means for rejecting said stalk material and directing the same into said second compartment.

3. In an arrangement of the character described, a liquid reservoir, a chute in communication with said reservoir for delivering intermixed leafy material and stalk material to said reservoir, an elevating conveyor passing through said reservoir for lifting the mixture of said material to an elevated position, a paddle wheel disposed between said chute and said elevator for directing the flow of material to said conveyor, said conveyor comprising a plurality of generally horizontally extending flights, each of said flights being generally triangular in cross section with one edge thereof extending generally horizontally to produce a streamlined flow of water when and as the flights pass through said liquid reservoir, each of said flights having affixed thereto a plurality of spaced vertically extending teeth elements, a combing roll cooperating with said conveyor, said combing roll having a plurality of teeth intermeshing with said teeth elements and serving in conjunction therewith, to condition the mixture of material carried by said conveyor, a discriminating roller for receiving said mixture of material from said conveyor, a first compartment for receiving said leafy material, a second compartment for receiving said stalk material, said discriminating roller incorporating means whereby the leafy material delivered thereto clings thereto in opposition to centrifugal forces developed on said leafy material, air jet means cooperating with said roll for removing said leafy material from said discriminating roll and for directing the same into said first compartment, and said discriminating roll incorporating means for rejecting said stalk material and for directing the same into said second compartment.

4. In an arrangement of the character described for separating leafy material from stalk material, a discriminating roll comprising a drum member, said drum member having a plurality of spaced teeth extending axially thereof and on the periphery thereof, the leading edge of said teeth being notched to retain said leafy material, and a bar extending axially of said drum on the periphery thereof and affixed to the trailing edges of said teeth to reject the stalk material.

References Cited in the file of this patent

UNITED STATES PATENTS

| | | |
|---|---|---|
| 556,111 | Talbot | Mar. 10, 1896 |
| 769,251 | Cook | Sept. 6, 1904 |
| 1,558,550 | Joy | Oct. 27, 1925 |
| 2,183,631 | Urschel | Dec. 19, 1939 |
| 2,316,556 | Butcher | Apr. 13, 1943 |
| 2,489,594 | Sherman | Nov. 29, 1949 |

FOREIGN PATENTS

| | | |
|---|---|---|
| 275,717 | Great Britain | Aug. 11, 1927 |
| 314,415 | Great Britain | June 26, 1929 |